United States Patent
Müller et al.

(10) Patent No.: US 8,556,544 B2
(45) Date of Patent: Oct. 15, 2013

(54) ARRANGEMENT FOR NOISE REDUCTION IN VACUUM SYSTEMS

(75) Inventors: Hannes Müller, Hamburg (DE); Frank Schneider, Berlin (DE); Carsten Ohlfest, Glückstadt (DE); Frank Rahn, Buxtehude (DE)

(73) Assignee: Airbus Operations GmbH (DE)

(*) Notice: Subject to any disclaimer, the term of this patent is extended or adjusted under 35 U.S.C. 154(b) by 0 days.

(21) Appl. No.: 11/886,763

(22) PCT Filed: Mar. 20, 2006

(86) PCT No.: PCT/EP2006/002530
§ 371 (c)(1),
(2), (4) Date: Sep. 20, 2007

(87) PCT Pub. No.: WO2006/100016
PCT Pub. Date: Sep. 28, 2006

(65) Prior Publication Data
US 2009/0074518 A1    Mar. 19, 2009

Related U.S. Application Data

(60) Provisional application No. 60/664,329, filed on Mar. 23, 2005.

(30) Foreign Application Priority Data

Mar. 23, 2005 (DE) .......................... 10 2005 013 566

(51) Int. Cl.
*B65G 53/36* (2006.01)
*B65G 53/46* (2006.01)
(52) U.S. Cl.
CPC .................................. *B65G 53/4691* (2013.01)
USPC .................................. 406/124; 406/14; 4/431
(58) Field of Classification Search
USPC ................ 406/124, 14, 30; 244/118.5, 129.1; 4/431
See application file for complete search history.

(56) References Cited

U.S. PATENT DOCUMENTS 861,549 A * 7/1907 Stoetzel ........................ 406/170
3,995,328 A * 12/1976 Carolan et al. ................... 4/316
(Continued)

FOREIGN PATENT DOCUMENTS

DE    37 14923 A1    12/1988
DE    37 14924 A1    12/1988
(Continued)

OTHER PUBLICATIONS

Office Action from Canada Application No. 2599360, dated Aug. 26, 2011.

*Primary Examiner* — Gene Crawford
*Assistant Examiner* — William R Harp
(74) *Attorney, Agent, or Firm* — Lerner, David, Littenberg, Krumholz & Mentlik, LLP

(57) ABSTRACT

The present invention relates to an arrangement for adapting the transportation behavior of material to be conveyed, which arrangement comprises a first container, which is coupleable to a first pressure level; a second container, which is coupleable to a second pressure level; a connecting line for transporting material to be conveyed from the first container to the second container; and a pressure reduction device by means of which a pressure difference between the first container and the second container is controllably variable.

31 Claims, 2 Drawing Sheets

(56) References Cited

U.S. PATENT DOCUMENTS

| | | | |
|---|---|---|---|
| 4,318,643 A * | 3/1982 | Larsson et al. | 406/14 |
| 4,521,925 A * | 6/1985 | Chen et al. | 4/362 |
| 4,783,859 A | 11/1988 | Rozenblatt et al. | |
| 4,861,200 A | 8/1989 | Lubbehusen et al. | |
| 4,909,676 A | 3/1990 | Heep et al. | |
| 5,007,117 A * | 4/1991 | Oldfelt et al. | 4/432 |
| 5,133,853 A | 7/1992 | Mattsson et al. | |
| 5,165,457 A * | 11/1992 | Olin et al. | 4/300 |
| 5,261,440 A | 11/1993 | Frank | |
| 5,303,739 A | 4/1994 | Ellgoth et al. | |
| 5,317,763 A | 6/1994 | Frank et al. | |
| 5,369,811 A * | 12/1994 | Serre | 4/213 |
| 5,372,710 A | 12/1994 | Frank | |
| 5,515,555 A * | 5/1996 | Wormcke | 4/431 |
| 5,813,061 A * | 9/1998 | Tornqist | 4/431 |
| 6,006,373 A * | 12/1999 | Hoang | 4/431 |
| 6,085,366 A * | 7/2000 | Pondelick et al. | 4/431 |
| 6,330,725 B1 * | 12/2001 | Karlsson et al. | 4/431 |
| 6,453,481 B1 * | 9/2002 | Pondelick et al. | 4/431 |
| 6,588,988 B2 * | 7/2003 | Zlotos | 406/14 |
| 6,964,543 B2 * | 11/2005 | Gerber | 406/14 |
| 6,990,993 B2 * | 1/2006 | Hafner et al. | 137/12 |
| 7,533,426 B2 * | 5/2009 | Pondelick | 4/651 |

FOREIGN PATENT DOCUMENTS

| | | |
|---|---|---|
| DE | 38 30 544 A1 | 3/1990 |
| DE | 42 27 518 A1 | 4/1993 |
| DE | 42 02 719 A1 | 8/1993 |
| WO | 0206594 A1 | 1/2002 |

* cited by examiner

ARRANGEMENT FOR NOISE REDUCTION IN VACUUM SYSTEMS

This application claims the benefit of the filing date of the German Patent Application No. 10 2005 013 566.8 filed Mar. 23, 2005 and of the U.S. Provisional Patent Application No. 60/664,329 filed Mar. 23, 2005, the disclosures of which are hereby incorporated herein by reference.

TECHNICAL FIELD

The present invention relates to an arrangement and a method for adapting the transportation behavior of material to be conveyed; to a means of locomotion; and to the use of an arrangement for adapting the transportation behavior of material to be conveyed in an aircraft.

TECHNOLOGICAL BACKGROUND

The term "vacuum systems" refers to special pneumatic conveyors. Generally speaking, in such conveyors transportation takes place in that a pressure difference is applied to the material to be conveyed, i.e. the material to be conveyed is entrained in the fluid flow generated as a result of the pressure difference, wherein generally air is used as the transport medium.

Especially in aircrafts, vacuum systems are used for the transportation of waste from the cabin, for example from toilets or galleys, to a central collecting tank. In this arrangement the material to be conveyed is conveyed to the collecting tank by way of a pipeline network. Negative pressure in the collecting tank in relation to the cabin pressure provides the required pressure difference.

In aircraft with pressurised cabins the pressure difference between the cabin and the environment is used directly to generate the negative pressure for pneumatic conveyance. When this pressure difference is insufficient, e.g. on the tarmac or at low altitudes, the required pressure difference is generated by a compressor.

In the case of toilets with a pneumatic conveyor system in aircraft systems, often a loud noise level arises. This noise is even noticed by the passengers in the cabin and is perceived by passengers to be uncomfortable.

Conventional measures to reduce the noise level at the feed-in location consist of closing the lid of the conveyance system prior to the flushing procedure so as to thereby keep the noise in check. Furthermore, attempts are made to instruct passengers by way of specific signage to take noise reduction measures such as for example to close the toilet lid. Up to now the kinetic energy of the material to be conveyed has been reduced at the inlet to the tank by means of tank inlet protection devices so as to prevent damage and wear.

However, up to now the above-described noise reduction measures have returned only moderate success, without effectively improving passenger comfort.

SUMMARY OF THE INVENTION

There may be a need to reduce noise generation in a pneumatic system for transporting a material to be conveyed.

According to an aspect of the invention there is provided an arrangement and a method for adapting the transportation behavior of material to be conveyed; a means of locomotion; and a use of an arrangement for adapting the transportation behavior of material to be conveyed in an aircraft according to the independent claims.

According to an exemplary embodiment of the invention an arrangement for adapting the transportation behavior of material to be conveyed is provided. The arrangement comprises at least one first container, which is coupleable to a first pressure level; at least a second container, which is coupleable to a second pressure level; and a connecting line for transporting material to be conveyed from the first container, of which there is at least one, to the second container, of which there is at least one. Furthermore, the arrangement comprises a pressure reduction device by means of which a pressure difference between the first container, of which there is at least one, and the second container, of which there is at least one, is controllably variable.

According to another exemplary embodiment of the invention a method for adapting the transportation behavior of material to be conveyed is created. In this method at least one first container is coupled to a first pressure level, at least one second container is coupled to a second pressure level, and material to be conveyed is transported from the first container, of which there is at least one, to the second container, of which there is at least one. Furthermore, a pressure reduction device for varying a pressure difference between the first container, of which there is at least one, and the second container, of which there is at least one, is controlled.

According to yet another exemplary embodiment of the invention a means of locomotion with an arrangement with the characteristics described above is created.

According to yet another exemplary embodiment of the invention an arrangement for adapting the transportation behavior of material to be conveyed, with the characteristics described above, is used in an aircraft.

According to an embodiment of the invention the noise level during a conveyance procedure can be reduced to such an extent that users (for example passengers of an aircraft) no longer perceive it negatively. With the arrangement and the method according to embodiments of the invention noise reduction, in particular as far as aircraft are concerned, is made possible by an economical and light-weight solution. Further, due to an adaptation of the pressure differences and accordingly of the transportation velocity, because of a deceleration of the fluid there occur less damages caused by the kinetic energy of the material to be conveyed. Keeping aircraft weight to a minimum is a very special objective.

In that according to one embodiment of the invention a pressure reduction device is provided in a pneumatic conveyance system, by means of which pressure reduction device a pressure difference between two containers can be controlled in a targeted way and can in particular be reduced, the transport characteristics can be influenced in a defined manner, in particular the transport speed can be attenuated, as a result of which noise generation is also reduced to a surprising degree.

The speed of the air at the feed-in location, which air entrains the material to be conveyed, largely depends on the position of the receiving tank in the pipe system and on the pressure in the collecting tank. At the same time this air speed determines the noise that is generated. By means of the reduction in the pressure difference noise development that arises can effectively be reduced.

The large pressure difference between the interior cabin pressure and the exterior ambient pressure at cruising altitude, which pressure difference in conventional systems can result in the fluid attaining enormous speeds, can be reduced in a targeted way such that the noise development at the feed-in location is significantly reduced.

Due to the reduction of the fluid velocity damages in particular at the container walls of the receiving container may be avoided effectively, because the material to be conveyed impinges at the container walls with an accordingly reduced kinetic energy.

It can be achieved that the generated noise level at the feed-in position and the kinetic energy of the material to be conveyed is reduced by influencing and adapting pressure differences in a conveyance system.

In a further exemplary embodiment the pressure reduction device comprises at least one ventilation unit between the first container and the second pressure level. This makes it possible to hold a pressure difference constant or to compensate any excessive pressure difference in that the pressure in the second container is increased. This ventilation unit can optionally be designed so as to be regulable or non-regulated. Furthermore, the ventilation device can comprise noise reduction devices, in particular sound absorbers, so as in this way to reduce the inflow noise from the cabin. In an exemplary embodiment a ventilation unit can be installed between the second container and the second pressure level and can be controlled in such a way that the material to be conveyed can flow from the second pressure level back to the second container.

In a further exemplary embodiment the pressure reduction device comprises at least one throttle element between the first container and the second pressure level, wherein the throttle element can be designed so as to be either regulable or non-regulated. The throttle element can regulate, i.e. reduce, the fluid speed, and can be installed either between a ventilation unit and the second pressure level in order to reduce the inflow speed at that location. Alternatively, it can be located between the second container and the second pressure level in order to reduce the speed at which the fluid flows out into the surroundings.

In a further exemplary embodiment the arrangement comprises a compressor element between the second pressure level and the second container in order to generate negative pressure in the second container, so that in the case of a high second pressure level there is nonetheless a pressure difference between the first container and the second container is provided, in that for example the pressure in the second container is reduced. Parallel to the compressor element there is the additional option of installing a regulable or non-regulated throttle element in a parallel branch so as not to influence the operation of the compressor as a result of the reduction, in other words without causing a throttling effect.

In a further exemplary embodiment a nonreturn valve or a check valve is attached in the connecting line between the second pressure level and the second container so as to prevent the fluid from flowing in from the second pressure level to the second container. The nonreturn valve can also be installed parallel to the compressor, and furthermore it can comprise an integrated throttle device.

In a further exemplary embodiment a separator is installed between the second container and the pressure level for separating the material to be conveyed from a fluid.

In a further exemplary embodiment the first container is connected to the connecting line by means of an actuating valve, wherein after actuation of the actuating valve transport of the goods to be conveyed can be started or stopped.

In a further exemplary embodiment noise reduction devices are provided, in particular are installed on the first container.

In a further exemplary embodiment an inlet protection device is affixed in the second container in order to reduce the kinetic energy of the material to be conveyed when said material enters the second container.

In a further exemplary embodiment the pressure reduction device comprises at least one component with integrated throttle and ventilation function between the second pressure level and the second container.

According to an exemplary embodiment of the invention, in an emergency the ventilation devices are closed essentially without any auxiliary energy, and/or the throttle elements are opened essentially without any auxiliary energy.

According to a further exemplary embodiment of the method, for the purpose of controlling the ventilation device and/or the throttle element the pressure difference between the first container and the second container is used as a command variable. In a further exemplary embodiment of the method, the command variable for controlling the ventilation unit and/or for controlling the throttle element can be set depending on the position of the first containers and/or of the second containers.

According to a further exemplary embodiment of the method the compressor element and the ventilation device can vary and set the pressure in a manner offset in time before and after conveying the material to be conveyed.

According to an exemplary embodiment of the method, for the purpose of controlling and regulating the ventilation device and/or the throttle elements, sensor data such as for example cabin pressure, ambient pressure, pressure and fill level of the second container, flight altitude or temperature can be used. This data also makes it possible to diagnose the vacuum system. For example by means of a flushing procedure that only involves air, and by measuring the resulting tank-pressure gradient, a comparison of the desired values with actual values for pressure losses can take place and in this way any malfunctions can be detected reliably and early.

The designs of the arrangement also apply to the method and to the means of locomotion as well as or their use, and vice versa.

The described arrangement and the described method provide effective noise reduction of transported material to be conveyed, so that the comfort, for example of passengers, is enhanced enormously. The kinetic energy can be optimally set with a controllable pressure ratio, as a result of which optimal setting, damage and noise are prevented or reduced. Furthermore, this arrangement is extremely light in weight and economical to implement.

The means of locomotion according to the invention can for example be an aircraft, a rail carriage, a truck, a passenger motor vehicle, a caravan, a boat or ship, or a zeppelin.

BRIEF DESCRIPTION OF THE DRAWINGS

Below, for further explanation and to provide a better understanding of the present invention, several embodiments of the invention are described in more detail with reference to the drawings, as follows.

DETAILED DESCRIPTION OF EXEMPLARY EMBODIMENTS

Figure 1:
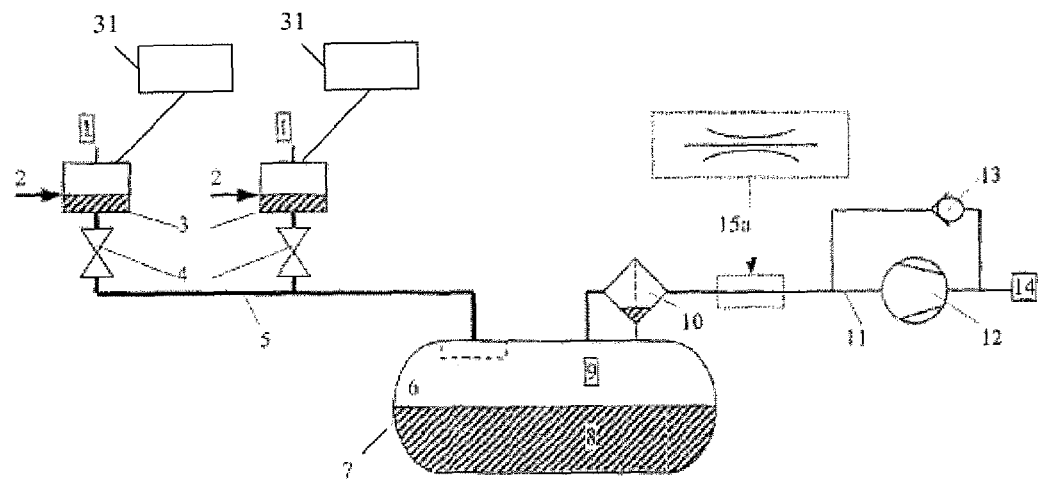
FIG. 1 a diagrammatic view of a vacuum system according to an exemplary embodiment of the invention.

Identical or similar components in different figures have the same reference characters.

The illustrations in the figures are diagrammatic and not to scale.

FIG. 1 shows an arrangement of a vacuum system for aircraft with a pressurised cabin.

In each case first containers 3 to accommodate a material 2 to be conveyed are connected by means of an actuating valve 4 to a connecting line 5 leading to a central second container 7. Noise reduction devices 31 are installed on each of first containers 3. At the inlet to the second container 7 there is a special tank inlet protection device 6, which among other thing's is designed to reduce the kinetic energy of the material 2 to be conveyed, so as to protect the second container 7. By means of a further connecting line 11 the collecting tank 7 is connected, by way of a separator 10 which includes a tank return and by way of a compressor element 12, to the second pressure level 14, here the environment outside the aircraft. Parallel to the compressor element 12 a return valve 13 is arranged.

If the pressure difference between the first pressure level 1 (ambient pressure at the feed-in location 3, for example cabin pressure) and the second pressure level, i.e. between the cabin 1 and the environment 14, is inadequate, the system is operated with the compressor element 12 (operating mode I). In this way the compressor 12 starts at the latest when a flushing procedure is requested. During the time interval of a few seconds until the opening of the actuating valve 4, negative pressure is already generated in the second container 7. Thus, as soon as the flush valve 4 is opened, conveyance to the tank, of the material 2 to be conveyed, commences. The compressor element 12 continues to run at least until the actuating valve 4 is closed again, thus maintaining negative pressure in the tank 7 for continuous conveyance. The separator 10 prevents any material 2 to be conveyed from escaping from the collecting container 7, and protects the compressor 12 and the environment 14 from contamination. The nonreturn valve 13 remains closed in this operating mode.

In an alternative operating mode II with sufficient pressure difference between the cabin 1 and the environment 14 the compressor element 12 remains switched off. When the actuating valves 4 are closed, the tank 7 is subjected to the same low pressure as in the environment 14 outside the aircraft. If the flush valve 4 is open, negative pressure in the tank 7 is maintained in that the air flows out by way of the nonreturn valve 13.

Up to now the compressor elements 12 have mostly been designed so as to provide just adequate conveyance behavior when the aircraft is on the ground. The nonreturn valve can already fully open at a small pressure difference, and the airflow through it can take place with minimum loss of pressure. Downstream of the separator 10 a non-regulated throttle device 15a is provided for easy adaptation of the conveyance behavior. However, generally speaking, this throttling position cannot be considered optimal for all forms of application because part of the expensively generated pressure difference is degraded during compressor operation 12.

Figure 2:
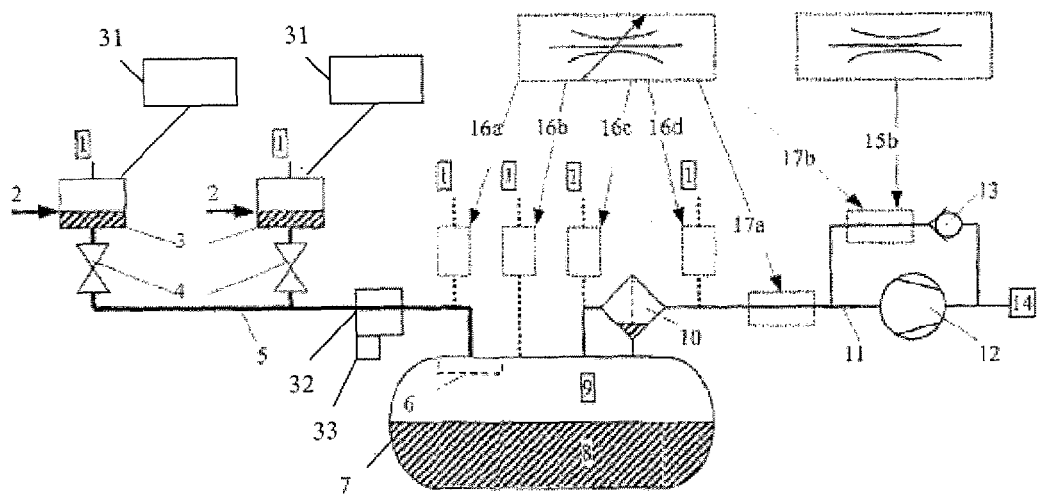
FIG. 2 a diagrammatic view of a vacuum system according to another exemplary embodiment of the invention with variants for regulating the through-flow speed.

In FIG. 2 a further arrangement for reducing noise at the feed-in locations of the material 2 to be conveyed has been provided by limiting the driving pressure difference to an extent necessary for the flushing procedure, preferably in operating mode II.

For reliable operation, this design point should be above the behavior with compressor operation. This still leaves sufficient potential to reduce noise at cruising altitude, at which normally the maximum pressure difference occurs. This applies in particular since in most cases this state represents the main share of the time vacuum systems in aircraft are used.

Essentially the air volume 9 in the collecting tank 7 causes a non-stationary pressure gradient in the second container 7 during the flushing procedure. Thus, most of the time, the pressure in the collecting tank 7 increases until the stationary state has been reached. This increase in pressure is determined by the flow losses from 9 to 14 in the stationary case. The pressure difference between the cabin 1 and the collecting tank 7 induces a corresponding time gradient of the air entry speed, and thus of the generated noise level at the first container 3.

In order to limit noise emission, an essentially constant pressure difference from 1 to 7 has to be ensured. Generally speaking an additional ventilation valve 16a-16d according to FIG. 2 can handle this task before, during and after the flushing procedure. However, this can be associated with high speeds or high volume flows between the connecting lines 5 or 11 or the tank 7 and the ventilation valve 16a-16d. This can be compensated for by using a further regulable throttle valve 17a or 17b downstream of the ventilation valve 16a-16d. If a throttle valve 15, 17 is used on its own, its influence is however limited to the duration of the flushing process.

Figure 3:
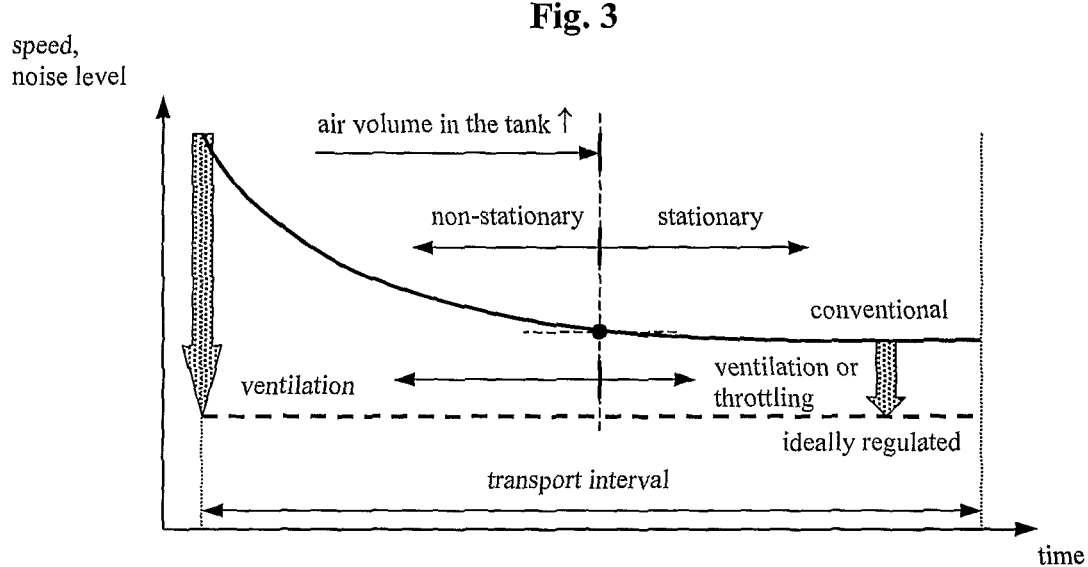
FIG. 3 a diagram showing the influence which ventilation and throttling have on the speed of transportation and on the noise level at the feed-in location, depending on the magnitude of the air volume in the tank.

The greater the air volume 9 in the tank, the stronger the effect the initial tank pressure has on the flushing process. In this case a stationary state only occurs after a relatively long opening time of the flush valve 4 (compare FIG. 3). Thus in this case ventilation assumes decisive importance.

In such a cases where a small second container 7 is used, the air volume 9 is small. It may thus be possible to abandon a ventilation valve 16a-16d. In the case of a small number of connected receiving containers 3, which are installed at similar distances from the tank 7, it is also possible to provide a non-regulated throttling element, for example at position 15b. At this position, compressor operation 12 is not affected by the reduction. Reduced conveyance performance at low flight altitudes, i.e. at small pressure differences, without compressor operation 12 can also be compensated for by extending compressor operation if need be. Moreover, the use of the system in this boundary region does not represent a typical application case.

In principle the actuating valve 16 can be installed at positions 16a-16d. Immediately after a request of a flushing procedure said actuating valve 16 sets the required tank pressure until the flush valve 4 is opened. This procedure can be interpreted as a counterpart to the evacuation phase during compressor operation 12. Subsequently, for example, the throttle valve keeps the tank pressure constant at position 17a or 17b during the flushing procedure.

Since the loss of pressure 1-9 depends on the length and the gradient of the connecting line 5, the pressure difference to be set should be implemented depending on the position of the first container 3. In this way the often very different transportation behavior of receiving containers 3 with different distances from the collecting tank 7 can be made to be uniform.

In the case of malfunction a ventilation valve 16 should assume a fully closed state, while a regulable throttle valve 17 should assume a fully open state, both without any auxiliary energy. In this way the system remains functional.

Also of interest is the combination of ventilation function and throttle function at positions 16d and 17a to a component.

As far as regulation is concerned, access to data that is already available in the aircraft system presents itself; such data being for example cabin pressure, ambient pressure and tank fill level (to determine the air volume in the tank). Furthermore, fill level determination based on two absolute pressure sensors directly provides information on the pressure in the tank 7. As shown in FIG. 2, a sensor 32 is positioned in line between first container 3 and second container 7. A monitoring device 33 is coupled to sensor 32. The sensor 32 and monitoring device 33 may also or alternatively be positioned in the tank 7. The use of additional sensors can thus be minimised by suitable system linkages.

From the regulating deviations for a flushing procedure that only involves air, it is furthermore possible to obtain information concerning possible blockages in the regions 1-9 and 9-14. This diagnostic function can also be transferred to conventional vacuum systems.

In addition it should be pointed out that "comprising" does not exclude other elements or steps, and "a" or "one" does not exclude a plural number. Furthermore, it should be pointed out that characteristics or steps, which have been described with reference to one of the above embodiments can also be used in combination with other characteristics or steps of other embodiments described above.

It should also be noted that reference signs in the claims shall not be construed as limiting the scope of the claims.

The invention claimed is:

1. An arrangement for an aircraft for adapting the transportation behavior of material to be conveyed, wherein the arrangement comprises:
    at least one first container coupleable to a first pressure level;
    at least one second container coupleable to a second pressure level;
    a connecting line for transporting material to be conveyed from the at least one first container to the at least one second container;
    a first actuating valve for coupling the at least one first container to the connecting line;
    a pressure reduction device for noise reduction wherein the pressure reduction device comprises at least one controllably variable ventilation unit, the pressure reduction device being at or downstream of the at least one second container,
    wherein the at least one ventilation unit is configured to control the pressure difference between the first pressure level and the at least one second container; and
    wherein the pressure in the at least one second container is configured to be increased before changing the first actuating valve from a closed state to an open state, which open state is adapted to start the transportation process such that the pressure difference between the first pressure level and the at least one second container is kept constant to generate a constant suction for transporting the material to be conveyed and the transport speed of the material to be conveyed is reduced, as a result of which noise generation is reduced;
    a compressor element between the second pressure level and the at least one second container to generate negative pressure in the at least one second container if the pressure difference between the first pressure level and the second pressure level is not sufficient for transporting the material.

2. The arrangement according to claim 1, wherein the at least one ventilation unit is configured so as to be regulable or non-regulated.

3. The arrangement according to claim 1, wherein the at least one ventilation unit comprises a noise reduction device comprising a sound absorber.

4. The arrangement according to claim 1, further comprising at least one throttle element installed between the at least one ventilation unit, and the at least one second container or the connecting line.

5. The arrangement according to claim 1, further comprising a separator installed between the at least one second container and the second pressure level, said separator being configured to accommodate material to be conveyed, so that transport of material to be conveyed from the at least one second container to the second pressure level is prevented, and wherein the at least one ventilation unit is installed between the second container and the separator.

6. The arrangement according to claim 1, further comprising a plurality of noise reduction devices installed on the at least one first container.

7. The arrangement according to claim 1, further comprising an inlet protection device affixed in a boundary region between the connecting line and the at least one second container.

8. The arrangement according to claim 1, wherein the pressure reduction device further comprises a component with integrated throttle and ventilation function between the second pressure level and the at least one second container.

9. The arrangement according to claim 1, further comprising a sensor for detecting at least one transport characteristic of material to be conveyed between the at least one first container and the at least one second container.

10. The arrangement according to claim 9, further comprising a monitoring device coupled to the sensor and configured for, based on at least one transport characteristic detected by the sensor, determining the functionability of the arrangement.

11. The arrangement according to claim 1, wherein the pressure reduction device further comprises at least one throttle element between the at least one first container and the second pressure level.

12. The arrangement according to claim 11, wherein the at least one throttle element is either regulable or non-regulated.

13. The arrangement according to claim 1, wherein the at least one controllably variable ventilation unit is installed directly to or downstream of the at least one second container.

14. The arrangement according to claim 1, wherein a regulable or non-regulated throttle element is connected parallel to the compressor element.

15. The arrangement according to claim 14, wherein the throttle element is installed between the at least one second container and the second pressure level.

16. The arrangement according to claim 1, further comprising a nonreturn valve in a connecting line between the second pressure level and the at least one second container.

17. The arrangement according to claim 16, wherein the nonreturn valve comprises an integrated throttle element.

18. A method for an aircraft for adapting the transportation behavior of material to be conveyed, comprising:
    coupling at least one first container to a first pressure level;
    coupling at least one second container to a second pressure level;
    maintaining a constant pressure difference between the first pressure level and the at least one second container to generate a constant suction for transporting material to be conveyed;
    transporting material to be conveyed, from the at least one first container to the at least one second container, via a connecting line, wherein a first actuation valve couples the at least one first container to the connecting line;
    controlling a pressure reduction device for noise reduction wherein the pressure reduction device comprises at least one controllably variable ventilation unit,
    wherein by the at least one ventilation unit the pressure difference between the first pressure level and the at least one second container is controlled and the pressure in the at least one second container is increased before changing the first actuating valve from a closed state to an open state, which open state is adapted to start the transportation process such that the transport velocity of the material to be conveyed is reduced, as a result of which noise generation is reduced, the pressure reduction device being at or downstream of the at least one second container;

reducing the pressure in the at least one second container by a compressor element, if the pressure difference between the first pressure level and the second pressure level is not sufficient for transporting the material.

19. The method according to claim 18, wherein by the pressure reduction device a transport speed of material to be conveyed is reduced, as a result of which noise generation at the first container is reduced.

20. The method according to claim 19, wherein in the case of a malfunction the pressure reduction device is essentially closed without any auxiliary energy.

21. The method according to claim 19, wherein for the purpose of controlling the at least one ventilation unit the pressure difference between the at least one first container and the at least one second container is used as a command variable.

22. The method according to claim 21, wherein the command variable for controlling the at least one ventilation unit is set depending on the position of the at least one first container and the at least one second container.

23. The method according to claim 19, wherein sensor data required for regulating the at least one ventilation unit is selected from the group consisting of cabin pressure data, ambient pressure data, fill level data, air volume, flight altitude data, and temperature data of the at least one second container.

24. The method according to claim 23, wherein from the sensor data desired values and actual values from the measured tank pressure gradient, are compared to diagnose malfunctions.

25. The method according to claim 23, wherein the sensor data is air volume of the at least one second container.

26. The method according to claim 18, wherein by the at least one ventilation unit arranged between the at least one second container and the second pressure level, the pressure is controlled in such a way that a flow of the material to be conveyed, into the at least one second container is made possible.

27. The method according to claim 18, wherein in the case of a malfunction the at least one ventilation unit is essentially closed without any auxiliary energy.

28. The method according to claim 18, wherein the pressure is altered and set by the compressor element and the at least one ventilation unit in a manner offset in time before and after conveying the material to be conveyed.

29. The method according to claim 18, wherein the at least one controllably variable ventilation unit is installed directly to or downstream of the at least one second container.

30. An aircraft comprising an arrangement for adapting the transportation behavior of material to be conveyed, wherein the arrangement comprises:

at least one first container coupleable to a first pressure level;

at least one second container coupleable to a second pressure level;

a connecting line for transporting material to be conveyed from the at least one first container to the at least one second container;

a first actuating valve for coupling the at least one first container to the connecting line;

a pressure reduction device for noise reduction wherein the pressure reduction device comprises at least one controllably variable ventilation unit, the pressure reduction device being at or downstream of the at least one second container, wherein the at least one ventilation unit is configured to control the pressure difference between the first pressure level and the at least one second container; and wherein the pressure in the at least one second container is configured to be increased before changing the first actuating valve from a closed state to an open state, which open state is adapted to start the transportation process such that the pressure difference between the first pressure level and the at least one second container is kept constant to generate a constant suction for transporting the material to be conveyed and the transport speed of the material to be conveyed is reduced, as a result of which noise generation is reduced;

a compressor element between the second pressure level and the at least one second container to generate negative pressure in the at least one second container if the pressure difference between the first pressure level and the second pressure level is not sufficient for transporting the material.

31. The aircraft according to claim 30, wherein the at least one controllably variable ventilation unit is installed directly to or downstream of the at least one second container.

* * * * *